(12) United States Patent
Nishizawa

(10) Patent No.: US 7,245,764 B2
(45) Date of Patent: Jul. 17, 2007

(54) IMAGE PROCESSING METHOD AND IMAGE PROCESSING APPARATUS UTILIZING LUMINANCE HISTOGRAMS, AND PROJECTOR

(75) Inventor: Masato Nishizawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 888 days.

(21) Appl. No.: 10/458,196

(22) Filed: Jun. 11, 2003

(65) Prior Publication Data

US 2004/0032982 A1 Feb. 19, 2004

(30) Foreign Application Priority Data

Jun. 27, 2002 (JP) .............................. 2002-188601

(51) Int. Cl.
*G06K 9/00* (2006.01)
*G06K 9/68* (2006.01)

(52) U.S. Cl. ..................................................... 382/168

(58) Field of Classification Search ................ 382/162, 382/167, 168, 171, 172, 173, 218, 275; 358/509, 358/515, 518, 520, 522, 523; 375/240.02, 375/240.12; 348/672, 687; 345/426, 581, 345/613

See application file for complete search history.

(56) References Cited

U.S. PATENT DOCUMENTS 5,359,369 A * 10/1994 Izawa et al. ................ 348/672

6,741,295 B2 * 5/2004 Nieuwenhuizen et al. .. 348/687
7,079,157 B2 * 7/2006 Deering ...................... 345/613
2003/0034974 A1 * 2/2003 Welch et al. ............... 345/426
2003/0052890 A1 * 3/2003 Raskar et al. ............... 345/581

FOREIGN PATENT DOCUMENTS

| JP | A-6-6820 | 1/1994 |
| JP | A-7-59108 | 3/1995 |
| JP | A-B2-7-99862 | 10/1995 |
| JP | A-8-56316 | 2/1996 |
| JP | A 08-139995 | 5/1996 |
| JP | A-8-331504 | 12/1996 |
| JP | A 10-224741 | 8/1998 |

\* cited by examiner

*Primary Examiner*—Amir Alavi
(74) *Attorney, Agent, or Firm*—Oliff & Berridge, PLC

(57) ABSTRACT

The invention provides an image processing method, an image processing apparatus, and a projector which determine a scene-change so as to perform an optimal tone conversion, luminance correction, or the like, for each scene of a moving image. An image processing apparatus includes a normalized-luminance-histogram computing unit to compute a normalized luminance histogram for each frame, histogram buffers to store normalized luminance histograms of respective comparing frames, a scene-change-detecting reference-value computing unit to compute scene-change-detecting reference values $\alpha$ and $\beta$ corresponding to correlations between two normalized luminance histograms of the first and second frames respectively stored in the histogram buffers, and a scene-change determining unit to determine whether a change in scenes between images of the first and second frames has occurred or not, in accordance with the scene-change-detecting reference values $\alpha$ and $\beta$.

9 Claims, 12 Drawing Sheets

IMAGE PROCESSING METHOD AND IMAGE PROCESSING APPARATUS UTILIZING LUMINANCE HISTOGRAMS, AND PROJECTOR

BACKGROUND OF THE INVENTION

1. Field of Invention

The present invention relates to an image processing method, an image processing apparatus, and a projector.

2. Description of Related Art

In the related art, when a moving image is displayed in an image-display apparatus, the moving image is subjected to tone-conversion processing, luminance-correction processing, or the like, which is adaptive to the situation of the moving image. In an exemplary related art method of performing such processing, an APL (average picture level) of a single frame, that is, an average luminance level of an image is used. With this method, the tone-conversion characteristic of the moving image is changed in accordance with the APL; for example, a large number of tone levels are allotted at the low-tone level side of the moving image when it is estimated that the image has a low APL and is hence dark as a whole.

However, when the image is subjected to adaptive processing only with the APL as a characterizing amount, the tone-conversion characteristic is decided in accordance with only the contrast of the screen, as a result, image processing suitable for the scene is not correctly performed. Also, with this APL-adaptive tone-conversion processing, even when an observer does not notice a change in the scene (hereinafter, referred to as a scene-change) with his or her eyes, the tone-conversion characteristic varies as the APL varies. Accordingly, the luminance of the image varies due to the variation in the tone-conversion characteristic or the like, thereby resulting in flickering and thus causing a risk of forming an unnatural image.

Therefore, in order to adaptively perform a tone conversion, a luminance correction, and the like for each scene of the moving image, it is desirable to detect a natural scene-change which agrees with that noticed by an observer with his or her eyes. An exemplary method of detecting a scene-change by using a luminance histogram is disclosed in Japanese Unexamined Patent Application Publication No. 8-331504. Hereinafter, a luminance histogram means a frequency distribution diagram of luminances of respective pixels in a single frame, where the horizontal axis of the diagram is the luminance level and the vertical axis is the number of pixels (frequency) having the corresponding luminance level.

In the method using such a luminance histogram, first, the histogram of each frame is computed. Next, a difference in frequencies at each luminance level for each luminance histogram between comparing frames is computed. Then, the sum total of the differences (in absolute value) of each frame is computed. Finally, when the sum total of the differences exceeds a predetermined threshold, it is determined that the scene-change between the comparing frames has occurred.

SUMMARY OF THE INVENTION

However, in the foregoing related art determination method using a luminance histogram, the shape of the frequency distribution of the luminance histogram is not taken into account, thereby sometimes resulting in disagreement between the determined result of the scene-change and the visual impression of an observer. To give an actual example, in a scene at night time where the whole screen is dark, the foregoing disagreement may occur when a spot light is suddenly turned on. In this case, the frequency distribution of a luminance histogram obtained in the scene after the spot light was suddenly turned on has a shape exhibiting a sharp rise in a high-luminance level region of the luminance histogram. Also, in this case, the shape of the frequency distribution in luminance level regions of the luminance histogram other than the above high-luminance level region is similar to that of a luminance histogram obtained before the spot light was turned on.

Accordingly, in an example of the scene where the spot light is turned on, in order to perform the tone conversion or the luminance correction, it is desirable to determine that no scene-change has occurred between the frames before and after the spot light was turned on. However, with the related art method using the luminance histogram, the frequency distribution having a shape exhibiting a sharp rise causes the difference in the luminance histograms between these frames to exceed a predetermined threshold. As a result, when the spot light was turned on, it is determined that the scene-change has occurred, and hence the tone-correction characteristic and the like vary, whereby the background luminance varies despite of the same scene, thereby leading to an unnatural image.

In view of the above-mentioned problems, the present invention provides an image processing method, an image processing apparatus, and a projector which determine a scene-change so as to perform an optimal tone conversion, luminance correction, or the like, for each scene of a moving image.

To address or solve the above, the present invention provides an image processing method which includes computing a normalized luminance histogram of each frame; computing scene-change-detecting reference values corresponding to correlations between two normalized luminance histograms of first and second frames computed in the computing of a normalized luminance histogram of each frame; and determining whether a change in scenes between images of the first and second frames has occurred or not, in accordance with the scene-change-detecting reference values. With this method, a scene-change of applying an optimal tone conversion, luminance correction, or the like for each scene of a moving image can be determined.

The scene-change-detecting reference values may include at least first and second scene-change-detecting reference values. With this arrangement, a scene-change can be accurately determined.

In order to compute the first scene-change-detecting reference value, the computing of scene-change-detecting reference values may include: computing the product of two distribution frequencies at each corresponding luminance level of the two normalized luminance histograms of the first and second frames; computing the square value of the distribution frequency at the corresponding luminance level of the normalized luminance histogram of the first frame; computing an absolute difference in the product and the square value; and computing the sum total of the absolute differences in a range of the luminance levels from the minimum luminance to the maximum luminance. This method provides a scene-change-detecting reference value demonstrating a degree of similarity between the distribution shape of the normalized luminance histogram of the first frame and the distribution shape of a histogram of the product of the two normalized luminance histograms of the first and second frames. If the histogram shapes of the two normalized luminance histograms of the first and second frames are similar to each other, since the distribution shape of the histogram of the product of the two normalized luminance histograms of the first and second frames is similar to the distribution shape of the normalized luminance histogram of the first frame, the scene-change-detecting reference value is small.

In order to compute the second scene-change-detecting reference value, the computing of scene-change-detecting reference values may include: computing the product of two distribution frequencies at each corresponding luminance level of the two normalized luminance histograms of the first and second frames; computing the square value of the distribution frequency at the corresponding luminance level of the normalized luminance histogram of the second frame; computing an absolute difference in the product and the square value; and computing the sum total of the absolute differences in a range of the luminance levels from the minimum luminance to the maximum luminance. This method provides a scene-change-detecting reference value demonstrating a degree of similarity between the distribution shape of the normalized luminance histogram of the second frame and the distribution shape of a histogram of the product of the two normalized luminance histograms of the first and second frames. If the distribution shapes of the two normalized luminance histograms of the first and second frames are similar to each other, since the distribution shape of the histogram of the product of the two normalized luminance histograms of the first and second frames is similar to the distribution shape of the normalized luminance histogram of the second frame, the scene-change-detecting reference value is small.

The scene-change determining step may include: comparing at least one of the first and second scene-change-detecting reference values with a predetermined threshold; and determining that a change in the scenes has occurred when the at least one of the scene-change-detecting reference values is equal to or greater than the predetermined threshold. With this method, a scene-change which is visually natural to an observer can be determined.

Also, the comparing and determining steps may determine that a change in the scenes has occurred when both of the first and second scene-change-detecting reference values are equal to or greater than another threshold that is smaller than a predetermined threshold. With this method, a scene-change can be determined more accurately.

Also, the comparing and determining steps may determine that a change in the scenes has occurred when the sum of the first and second scene-change-detecting reference values is equal to or greater than a predetermined value.

In addition, the present invention provides an image processing apparatus which includes a normalized-luminance-histogram computing unit to compute a normalized luminance histogram of each frame; a normalized-luminance-histogram storage unit to store the normalized luminance histogram of the frame; a scene-change-detecting reference-value computing unit to compute scene-change-detecting reference values corresponding to correlations between two normalized luminance histograms of first and second frames stored in the normalized-luminance-histogram storage units; and a scene-change determining unit to determine that a change in scenes between images of the first and second frames has occurred or not, in accordance with the scene-change-detecting reference values. With the configuration, a scene-change for applying an optimal tone conversion, luminance correction, or the like for each scene of a moving image can be determined.

Furthermore, the present invention provides a projector which includes a light source to feed illumination light; a space modulation element to modulate the light from the light source in accordance with an image signal; an image processing apparatus to process an image from the space modulation element; and a projector to project the image processed by the image processing apparatus. With the configuration, a scene-change to apply an optimal tone conversion, luminance correction, or the like for each scene of a moving image can be determined.

DETAILED DESCRIPTION OF PREFERRED EMBODIMENTS

Exemplary embodiments of the present invention are described below in detail with reference to the accompanying drawings.

First Exemplary Embodiment

Figure 1:
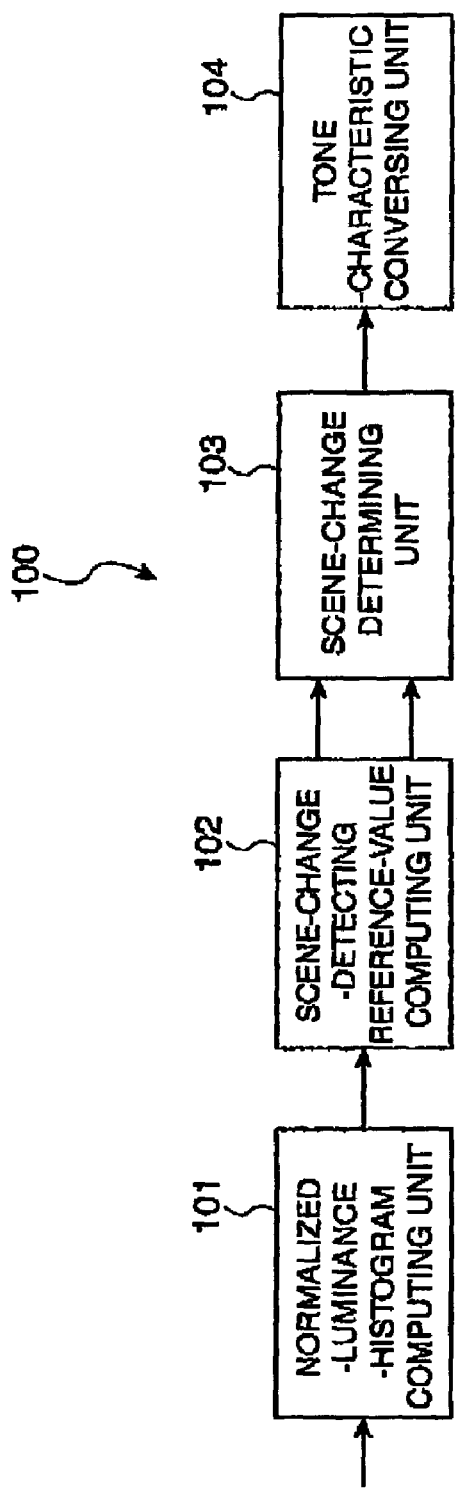
FIG. 1 is a schematic of an image processing apparatus according to a first exemplary embodiment of the present invention.
Figure 5:
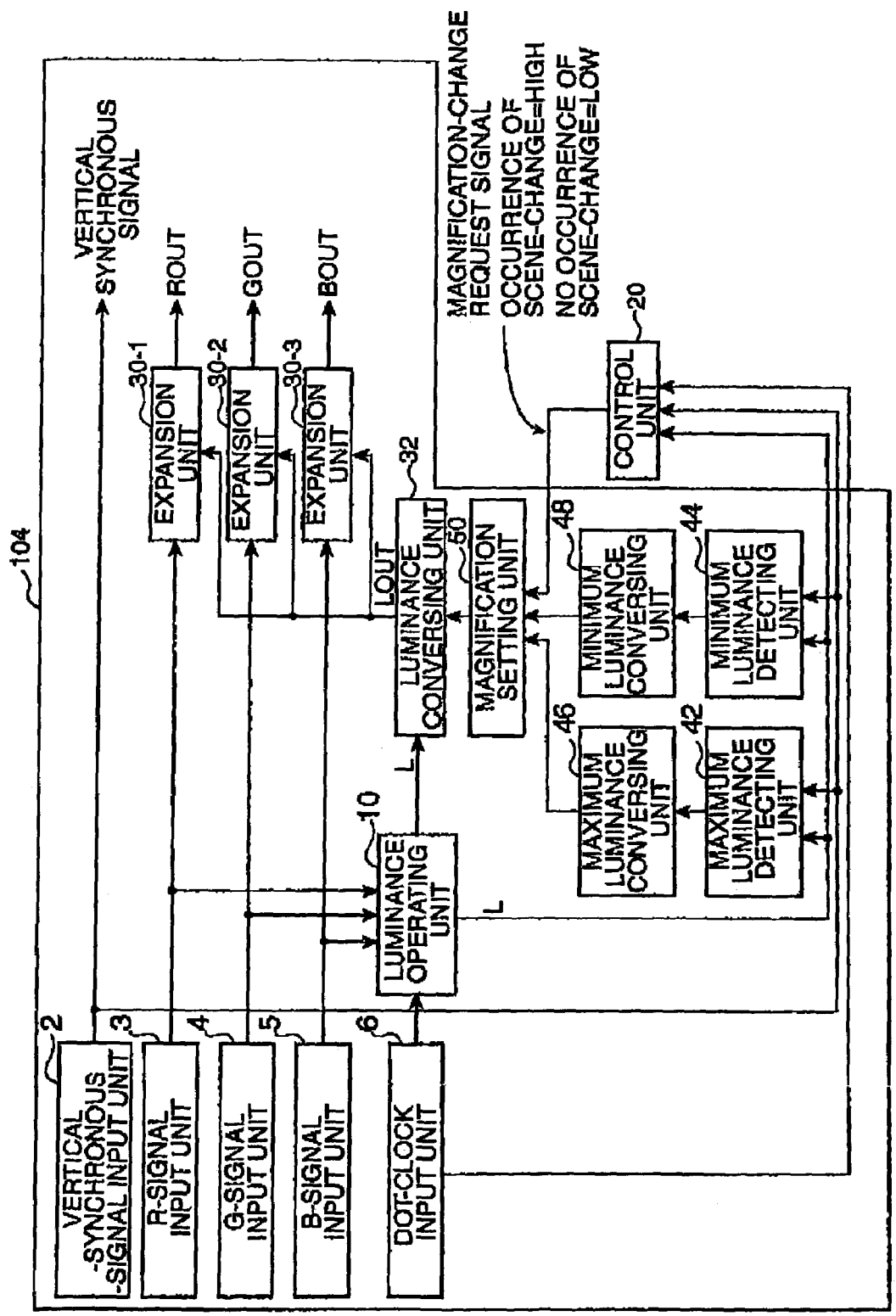
FIG. 5 is a schematic of a black-and-white expansion circuit according to the first exemplary embodiment.

FIG. 1 is a schematic that illustrates an image processing apparatus 100 according to a first exemplary embodiment of the present invention. A normalized-luminance-histogram computing unit 101 computes a normalized luminance histogram of each frame by normalizing the corresponding luminance histogram to 1 with respect to the maximum value thereof. The normalized luminance histogram is a data in which each bar shows the amount (number) of pixels having a certain tone (i.e., in a certain luminance level, or in a predetermined range of luminance). A scene-change-detecting reference-value computing unit 102 computes a scene-change-detecting reference value (one of correlation reference values) corresponding to a degree of similarity between the distribution shapes of normalized luminance histograms of comparing frames. A scene-change determining unit 103 determines whether a scene-change between the images of the comparing frames has occurred or not, in accordance with the scene-change-detecting reference values. Finally, a tone-characteristic conversing unit 104 performs a tone conversion by selecting an enhanced or optimal tone characteristic in accordance with the occurrence of the scene-change. The normalized-luminance-histogram computing unit 101, the scene-change-detecting reference-value computing unit 102, and the scene-change determining unit 103 are included in a control unit 20 (FIG. 5). The configurations of the control unit 20 and the tone-characteristic conversing unit 104 are described below.

Figure 2:
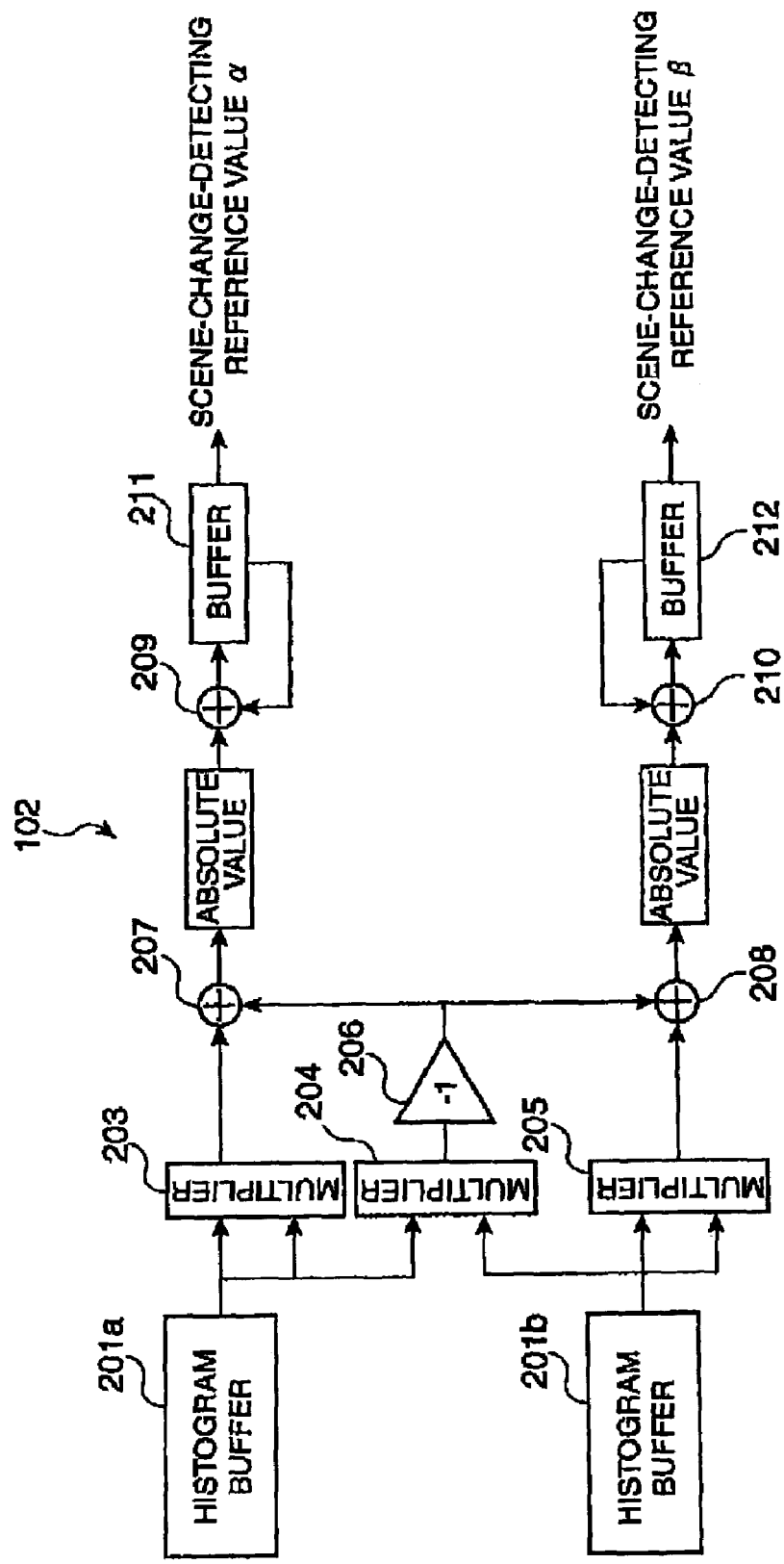
FIG. 2 is a schematic of a scene-change-detecting reference-value computing unit according to the first exemplary embodiment.

FIG. 2 illustrates the further detailed configuration of the scene-change-detecting reference-value computing unit 102 in the image processing apparatus 100. According to the configuration of the scene-change-detecting reference-value computing unit 102 shown in FIG. 2, two different scene-change-detecting reference values α and β are computed. First, a procedure of computing the scene-change-detecting reference value α is described.

A histogram buffer 201a stores a normalized luminance histogram of a first frame (i.e., an immediately preceding frame followed by a current frame), computed by the normalized-luminance-histogram computing unit 101 shown in FIG. 1. Likewise, a histogram buffer 201b stores a normalized luminance histogram of a second frame (the current frame) following the first frame, computed by the normalized-luminance-histogram computing unit 101.

A multiplier 203 sequentially reads the normalized luminance histograms stored in the histogram buffers 201a and 201b beginning from the leading address. Meanwhile, one address corresponds to one tone of a normalized histogram. Then, the multiplier 203 computes the square value of a distribution frequency at each corresponding luminance level of the normalized luminance histogram of the first frame.

A multiplier 204 computes the product of two distribution frequencies at each corresponding luminance level of the two normalized luminance histograms of the first and second frames. A sign changer 206 multiplies the product computed by the multiplier 204 by −1 so as to change the sign of the product. An accumulator 207 adds the sign-changed product computed by the sign changer 206 to the square value computed by the multiplier 203.

In other words, the accumulator 207 computes a difference in the product of the two distribution frequencies at each corresponding luminance level of the two normalized luminance histograms of the first and second frames and the square value of the distribution frequency at the corresponding luminance level of the normalized luminance histogram of the first frame.

The value computed by the accumulator 207 is input into an accumulator 209. A buffer 211 is connected to the output side of the accumulator 209. The buffer 211 holds the result operated by up to the accumulator 209 in accordance with the normalized luminance histograms stored in the histogram buffers 201a and 201b for the immediately preceding address followed by the current address which is now subjected to operation. The accumulator 209 adds an operation result of the immediately preceding address held in the buffer 211 to that of the current address from the accumulator 207.

When the above-mentioned operation is performed down to the final address of the histogram buffers 201a and 201b, the sum total of differences in the products of the distribution frequencies at the corresponding luminance levels of the two normalized luminance histograms of the first and second frames and the square values of the distribution frequencies at the corresponding luminance levels of the normalized luminance histogram of the first frame is computed. This sum total is the scene-change-detecting reference value α.

More particularly, when A(i) represents a normalized histogram of the immediately preceding frame followed by the current frame and B(i) represents a normalized histogram of the current frame, the following Numerical Expression (1) is satisfied.

$$\alpha = \sum_{i=0}^{255} |A(i)^2 - A(i) \cdot B(i)| \qquad \text{Numerical Expression (1)}$$

In this exemplary embodiment, i represents a non-negative integer from 0 to 255 and each of the differences is computed so as to provide an absolute value.

Next, a procedure of computing the scene-change-detecting reference value β is described. A multiplier 205 sequentially reads the normalized luminance histograms stored in the histogram buffers 201a and 201b beginning from the leading address. Meanwhile, one address corresponds to one tone of a normalized histogram. Then, the multiplier 205 computes the square value of a distribution frequency at each corresponding luminance level of the normalized luminance histogram of the second frame.

In a similar fashion to that described above, a multiplier 204 computes the product of two distribution frequencies at each corresponding luminance level of the two normalized luminance histograms of the first and second frames. In addition, the sign changer 206 likewise multiplies the product computed by the multiplier 204 by −1 so as to change the sign of the product. An accumulator 208 adds the sign-changed product from the sign changer 206 to the square value computed by the multiplier 205.

In other words, the accumulator 208 computes a difference in the product of the two distribution frequencies at each corresponding luminance level of the two normalized luminance histograms of the first and second frames and the square value of the distribution frequency at the corresponding luminance level of the normalized luminance histogram of the second frame.

The value computed by the accumulator 208 is input into an accumulator 210. A buffer 212 is connected to the output side of the accumulator 210. The buffer 212 holds the result operated by up to the accumulator 210 in accordance with the normalized luminance histograms stored in the histogram buffers 201a and 201b for the immediately preceding address followed by the current address which is now subjected to operation. The accumulator 210 adds an operation result of the immediately preceding address held in the buffer 212 to that of the current address from the accumulator 208.

When the above-mentioned operation is performed down to the final address of the histogram buffers 201a and 201b, the sum total of differences in the products of the distribution frequencies at the corresponding luminance levels of the two normalized luminance histograms of the first and second frames and the square values of the distribution frequencies at the corresponding luminance levels of the normalized luminance histogram of the second frame is computed. This sum total is the scene-change-detecting reference value β.

More particularly, when A(i) represents a normalized histogram of the immediately preceding frame followed by the current frame and B(i) represents a normalized histogram of the current frame, the following Numerical Expression (2) is satisfied.

$$\beta = \sum_{i=0}^{255} |B(i)^2 - A(i) \cdot B(i)|$$

Numerical Expression (2)

In this exemplary embodiment, i represents a non-negative integer from 0 to 255 and each of the differences is computed so as to provide an absolute value.

Although the two histogram buffers 201a and 201b are provided in the above-described configuration, the number of histogram buffers is not limited to two, and three or more histogram buffers may be provided. In the latter case, the above-described operations are performed for the preceding frames in accordance with the number of histogram buffers. Therefore, the same number of scene-change-detecting reference values as that of histogram buffers are computed.

Figure 3:
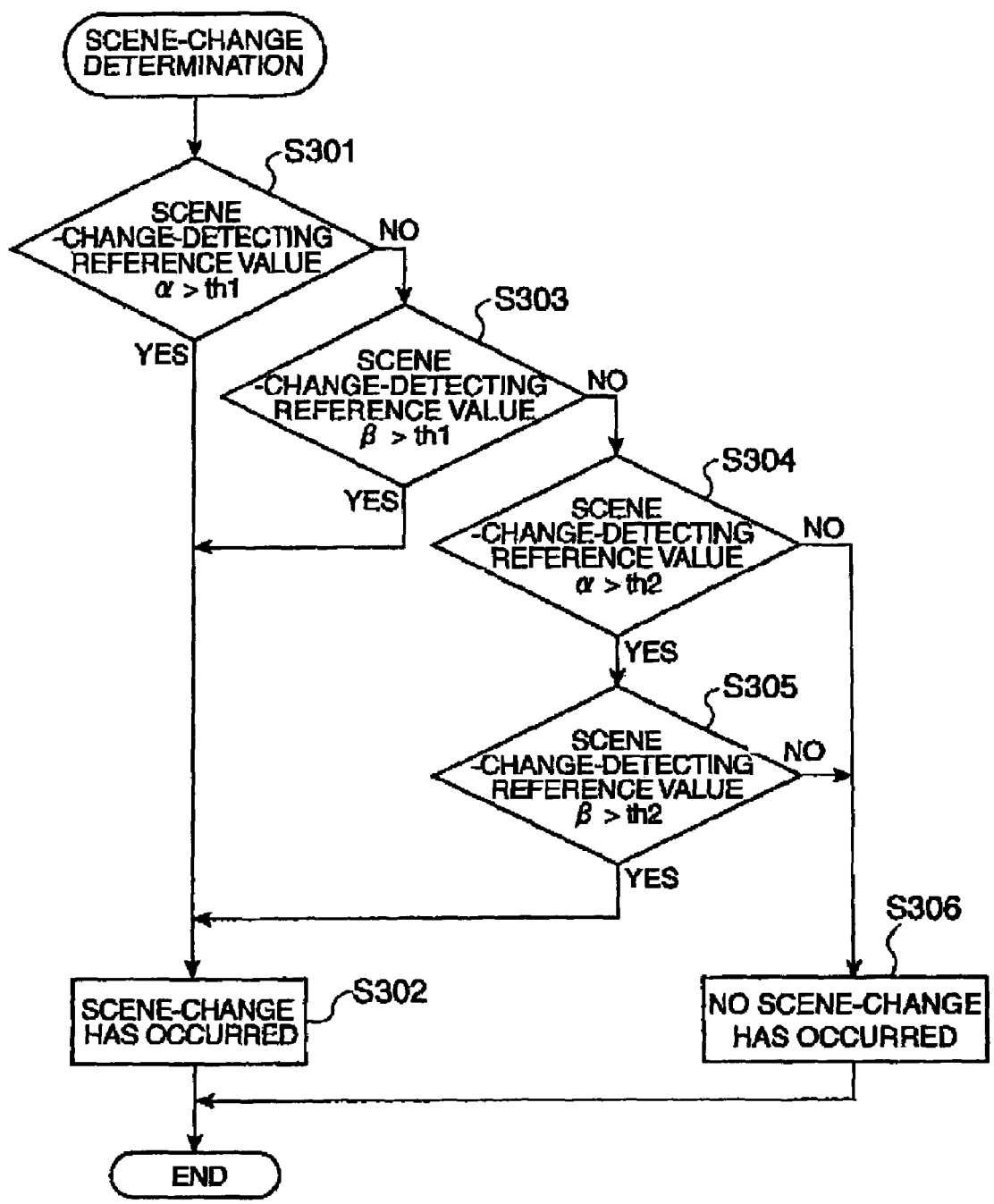
FIG. 3 is a flowchart to determine the occurrence of a scene-change in the first exemplary embodiment.

Next, a step of determining the occurrence of a scene-change in accordance with the computed scene-change-detecting reference values α and β is described. FIG. 3 is a flowchart of a procedure of determining the occurrence of a scene-change. This determination is made by comparing the scene-change-detecting reference values α and β with two thresholds th1 and th2, where th1>th2.

In Sub-step S301, it is determined whether the scene-change-detecting reference value α is greater than the threshold th1 or not. If affirmative, the step advances to Sub-step S302 and it is determined that a scene-change has occurred. If not affirmative, the step advances to Sub-step S303 and it is determined whether the scene-change-detecting reference value β is greater than the threshold th1 or not. If affirmative, the step advances to Sub-step S302 and it is determined that a scene-change has occurred. If not affirmative, the step advances to Sub-step S304.

In Sub-step S304, it is determined whether the scene-change-detecting reference value β is greater than the threshold th2 or not. If not affirmative, the step advances to Sub-step S306 and it is determined that no scene-change has occurred. If affirmative, the step advances to Sub-step S305. In Sub-step S305, it is determined whether the scene-change-detecting reference value β is greater than the threshold th2 or not. If not affirmative, the step advances to Sub-step S306 and it is determined that no scene-change has occurred. If affirmative, the step advances to Sub-step S302 and it is determined that a scene-change has occurred. When it is determined in Sub-step S306 that a scene-change has occurred, the scene-change determining unit 103 outputs a magnification-change request signal, which is described below, to the tone-characteristic conversing unit 104.

In the above-described determination step, when at least one of the following two conditions is satisfied, it is determined that a scene-change has occurred, where th1>th2, as mentioned above.

α>th1 or β>th1 (1)

α>th2 and β>th2 (2)

In addition, when the sum of the scene-change-detecting reference values α and β is greater than a third threshold γ, it may be determined that a scene-change has occurred.

Next, this exemplary embodiment is described with a variety of examples of normalized luminance histograms.

FIGS. 4(a) to 4(l) are graphs of a variety of normalized luminance histograms. In each of these figures, the horizontal axis is the luminance level and the vertical axis is the frequency (i.e., the number of pixels). FIGS. 4(a), 4(d), 4(g), and 4(j) are graphs of histograms A1, A2, A3, and A4, respectively, each obtained by squaring a luminance histogram of the immediately preceding frame followed by the corresponding current frame. FIGS. 4(b), 4(e), 4(h), and 4(k) are graphs of histograms B1, B2, B3, and B4, respectively, each obtained by squaring a luminance histogram of the corresponding current frame. FIGS. 4(c), 4(f), 4(i), and 4(l) are graphs of histograms C1, C2, C3, and C4, respectively, each obtained by multiplying the luminance histogram of the corresponding current frame with the histogram of the immediately preceding frame followed by the corresponding current frame.

Figure 4:
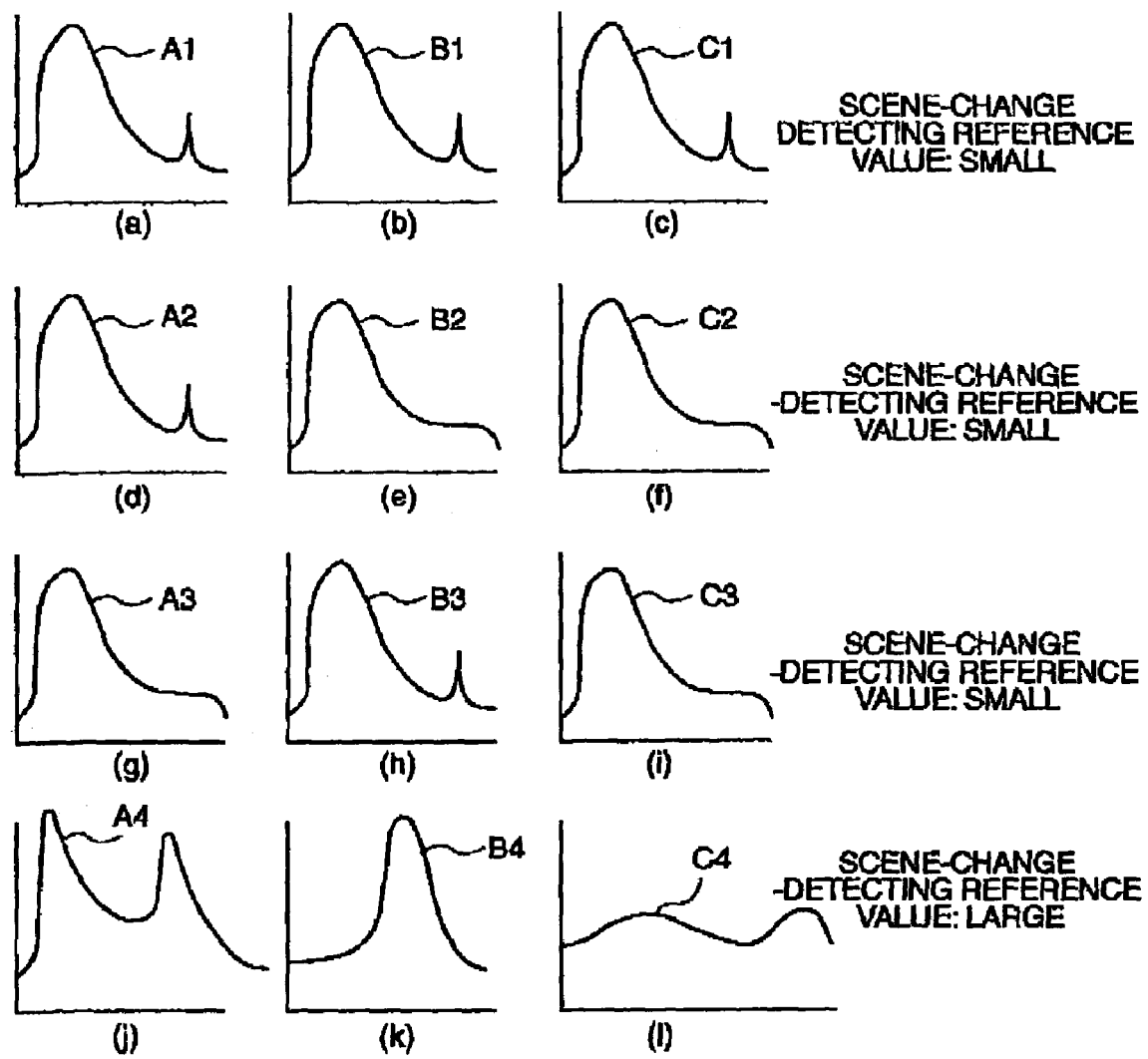
FIGS. 4(a) to 4(l) are graphs of a variety of examples of luminance histograms in the first exemplary embodiment.

In a first example shown by FIGS. 4(a) to 4(c), hardly any change in images between the two comparing frames is observed. In this case, the distribution shapes of the luminance histograms A1 and C1 and those of the luminance histograms B1 and C1 are substantially the same with each other, respectively. Accordingly, two scene-change-detecting reference values computed from the luminance histograms A1 and C1 and from the luminance histograms B1 and C1 are small.

In a second example shown by FIGS. 4(d) to 4(f), an object which is present in the immediately preceding frame is absent in the current frame between the two comparing frames. In this case, the distribution shapes of the luminance histograms B2 and C2 are substantially the same with each other. Accordingly, a scene-change-detecting reference value computed from these luminance histograms is small.

In a third example shown by FIGS. 4(g) to 4(i), an object which is absent in the immediately preceding frame is present in the current frame between the two comparing frames. In this case, the distribution shapes of the luminance histograms A3 and C3 are substantially the same with each other. Accordingly, a scene-change-detecting reference value computed from these luminance histograms is small.

In a fourth example shown by FIGS. 4(j) to 4(l), the distribution shapes of the luminance histograms of the two comparing frames are different from each other. In this case, the distribution shapes of the luminance histograms of A4 and C4 and those of luminance histograms B4 and C4 are drastically different from each other, respectively. Accordingly, two scene-change-detecting reference values computed from these luminance histograms are large.

In these four examples, when at least one of the foregoing conditions (1) and (2) is satisfied, it is determined that a scene-change has occurred. Therefore, it is determined that a scene-change has occurred only in the fourth example and that no scene-change has occurred in the first to third examples. In this exemplary embodiment, as described above, the occurrence of a scene-change is determined in accordance with the similarity (correlation) of the distribution shapes of luminance histograms. Thus, a scene-change which is visually natural to an observer can be detected. As a result, image processing, such as an enhanced or optimal tone conversion, can be performed, taking the feature of each scene into account.

Next, an image processing circuit for changing an expansion magnification in black-and-white expansion processing when a scene-change is detected by the scene-change determining unit 103 is described. FIG. 5 is a schematic of an example black-and-white expansion circuit according to this exemplary embodiment.

The black-and-white expansion circuit according to this exemplary embodiment includes a luminance operating unit 10 to compute a luminance serving as a reference value (hereinafter, referred to as a reference luminance) in accordance with a luminance from each of RGB (red, green, and blue) signals; a maximum luminance detecting unit 42 serving as a magnification setting device to set an expansion magnification (i.e., a degree of expansion) of the luminance from each of the RGB signals in accordance with the corresponding computed reference luminance; a maximum luminance conversing unit 46; a minimum luminance detecting unit 44; a minimum luminance conversing unit 48; and a magnification setting unit 50.

The black-and-white expansion circuit according to this exemplary embodiment also includes the control unit 20 to control the magnification setting unit 50; a luminance conversing unit 32 to determine in which direction; the black or white direction, an expansion is performed, in accordance with the degree of expansion set by the magnification setting unit 50; and expansion units 30-1 to 30-3 to expand the luminances from the corresponding RGB signals. The luminance conversing unit 32 and the expansion units 30-1 to 30-3 serve as an expanding device.

The luminance operating unit 10 receives R-signal, G-signal, and B-signal from an R-signal input unit 3, a G-signal input unit 4, and a B-signal input unit 5 with a timing in accordance with a dot-clock signal from a dot-clock input unit 6 and computes a reference luminance.

Figure 6:
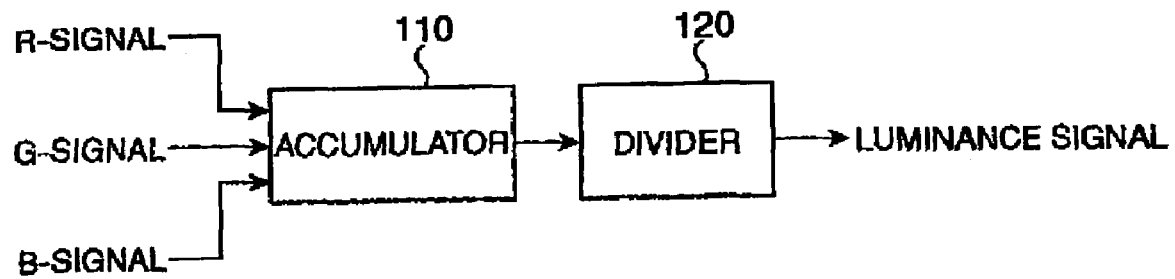
FIG. 6 is a schematic that illustrates the circuit configuration of a luminance operating unit according to the first exemplary embodiment.

FIG. 6 illustrates the circuit configuration of an example of the luminance operating unit 10 according to this exemplary embodiment. The luminance operating unit 10 includes an accumulator 110 and a divider 120. The accumulator 110 computes the sum of the RGB signals, and the divider 120 divides the sum computed by the accumulator 110 by 3 so as to output the reference luminance.

In a general way of computing, the reference luminance is given by the following numerical expression: reference luminance=0.30×R-signal+0.59×G-signal+0.11×B-signal. Since a human eye has a different sensitivity to each of these colors, the foregoing different weights are assigned to the respective RGB signals. The value obtained as mentioned above may be used as a reference luminance.

However, when the luminance is computed with the above numerical expression in order to perform a black-and-white expansion, sometimes a portion of the luminance largely occupied by the luminance component from the G-signal is more remarkably expanded.

In view of the above-problem, in this exemplary embodiment, the reference luminance is computed by the following numerical expression: reference luminance=(R-signal+G-signal+B-signal)/3.

The maximum luminance conversing unit 46 determines to what extent the maximum luminance detected by the maximum luminance detecting unit 42 is expanded. Also, the minimum luminance conversing unit 48 determines to what extent the minimum luminance detected by the minimum luminance detecting unit 44 is expanded.

In this exemplary embodiment, the image processing apparatus 100 is designed such that a luminance in a tone region close to the maximum luminance and a luminance in a tone region close to the minimum luminance are less expanded than a luminance in a middle tone region (hereinafter, referred to as a middle tone luminance). The reason for this is that, when the maximum luminance is expanded, the color of an image becomes unsharp in a tone region in which a luminance is close to zero, that is, in a tone region close to black, and likewise the color thereof becomes unsharp in a tone region in which a luminance is close to 255; that is, in a tone region close to white.

Also, even when the expansion magnifications of luminances close to the maximum and minimum luminances are made smaller as described above, since the changes in tones of pixels in regions close to the maximum and minimum luminances are hardly noticed, the black-and-white expansion can be effectively performed by further expanding the middle-tone luminance.

The reference luminance computed by the luminance operating unit 10 as described above is input into the maximum luminance detecting unit 42, the minimum luminance detecting unit 44, and the control unit 20.

The maximum luminance detecting unit 42 detects the maximum luminance of each frame in accordance with the reference luminance sent from the luminance operating unit 10. Likewise, the minimum luminance detecting unit 44 detects the minimum luminance of each frame in accordance with the reference luminance sent from the luminance operating unit 10. The maximum and minimum luminance detecting units 42 and 44 determine the change-over timing of successive frames in accordance with a vertical synchronous signal from a vertical-synchronous-signal input unit 2.

A post-expansion maximum luminance signal representing the maximum luminance converted by the maximum luminance conversing unit 46, a pre-expansion maximum luminance signal representing the maximum luminance which is yet to be converted, a post-expansion minimum luminance signal representing the minimum luminance converted by the minimum luminance conversing unit 48, a pre-expansion minimum luminance signal representing the minimum luminance which is yet to be converted, and a magnification-change request signal from the control unit 20 are input into the magnification setting unit 50.

Next, the circuit configuration of the magnification setting unit 50 is described.

Figure 7:
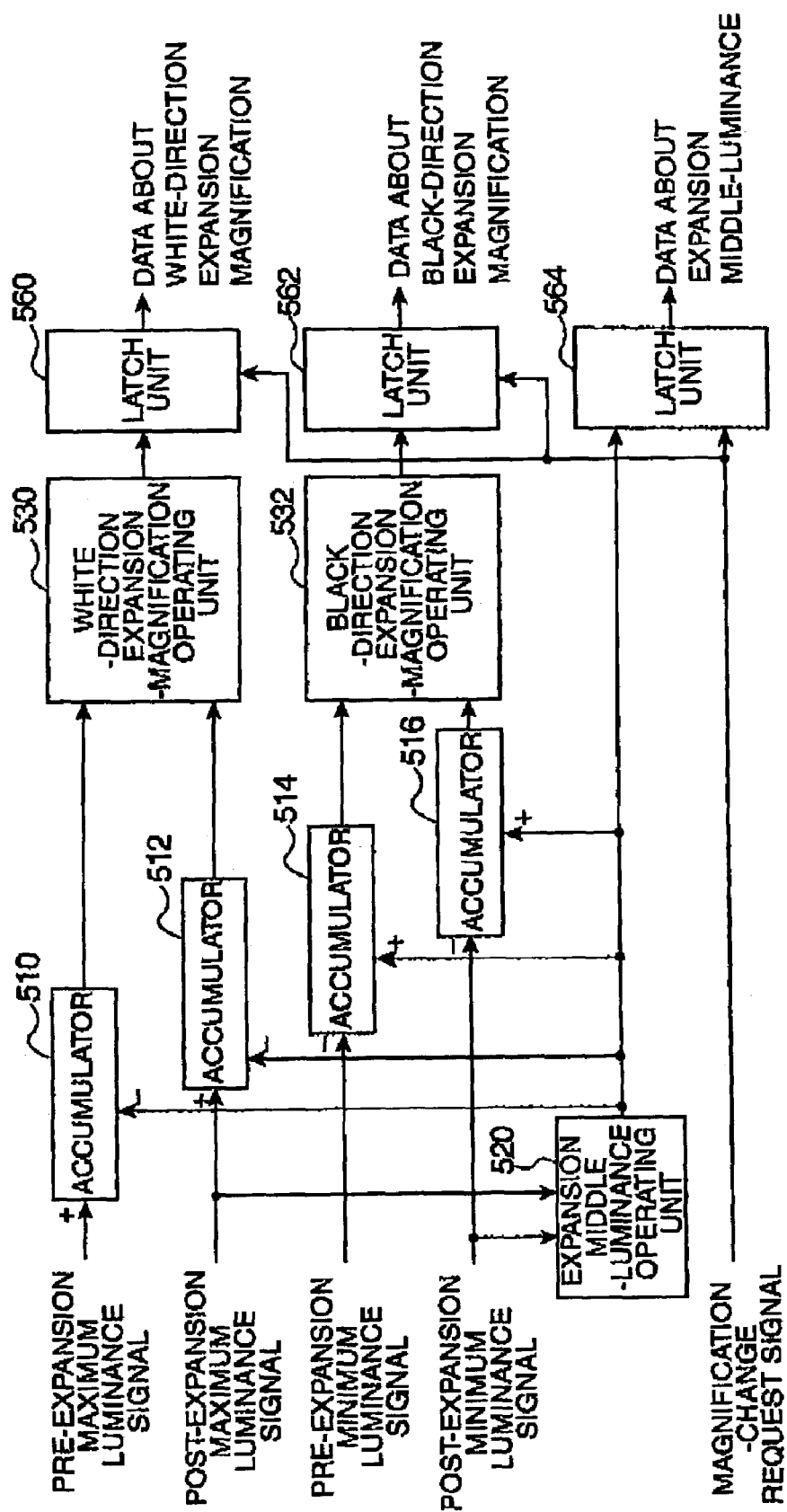
FIG. 7 is a schematic that illustrates the circuit configuration of a magnification setting unit according to the first exemplary embodiment.

FIG. 7 illustrates the circuit configuration of an example of the magnification setting unit 50 according to this exemplary embodiment.

The magnification setting unit 50 includes an expansion middle-luminance operating unit 520, a white-direction expansion-magnification operating unit 530, a black-direction expansion-magnification operating unit 532, four accumulators 510, 512, 514, and 516, and three latch units 560, 562, and 564.

Also, the magnification setting unit 50 receives the pre-expansion maximum luminance signal and the post-expansion maximum luminance signal from the maximum luminance conversing unit 46; the pre-expansion minimum luminance signal and the post-expansion minimum luminance signal from the minimum luminance conversing unit 48; and the magnification-change request signal from the control unit 20.

The expansion middle-luminance operating unit 520 receives the post-expansion maximum luminance signal and the post-expansion minimum luminance signal and outputs data representing an expansion middle-luminance to the accumulator 510 and the latch unit 564.

The expansion middle-luminance is described below.

Figure 8:
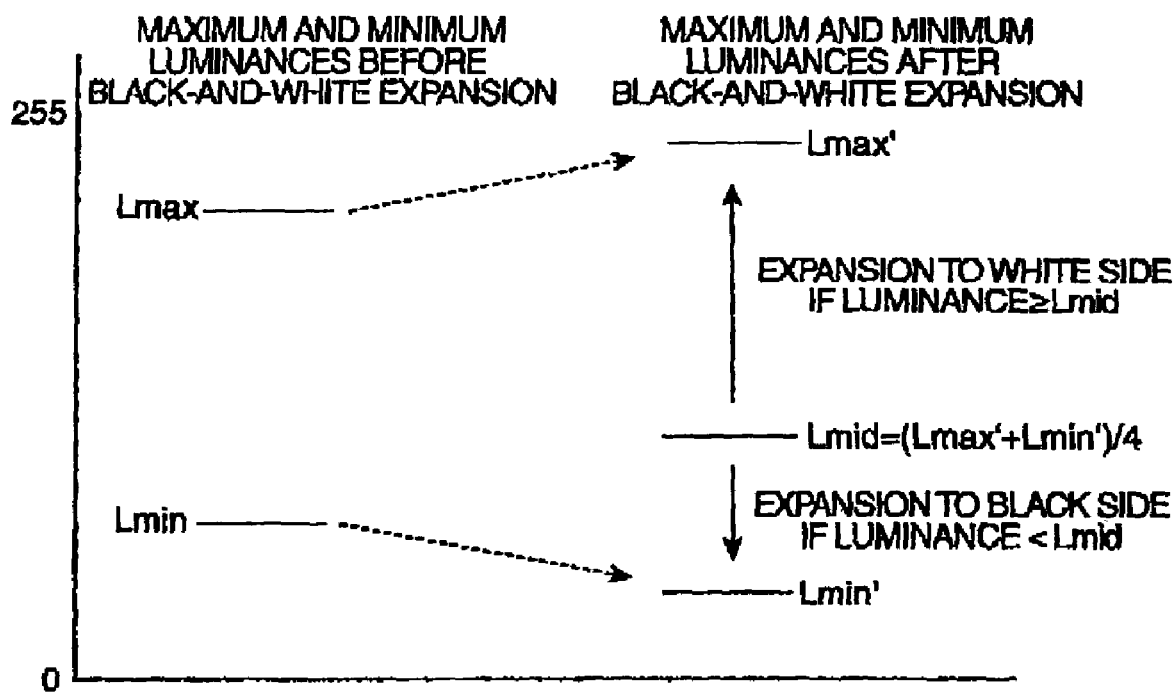
FIG. 8 is a graph that illustrates an expansion middle-luminance according to the first exemplary embodiment.

FIG. 8 is a graph illustrating the conversions of a maximum luminance Lmax and a minimum luminance Lmin according to this exemplary embodiment. In this exemplary embodiment, it is assumed that the image processing is performed with 8 bits, 256 tones.

The maximum and minimum luminance conversing units 46 and 48 respectively expand the maximum and minimum luminances Lmax and Lmin before black-and-white expansion of each pixel in one image (one frame) toward black side or white side. As shown in FIG. 8, the post-expansion maximum luminance Lmax' is greater than the pre-expansion maximum luminance Lmax, and the post-expansion minimum luminance Lmin' is smaller than the pre-expansion minimum luminance Lmin.

Figure 11:
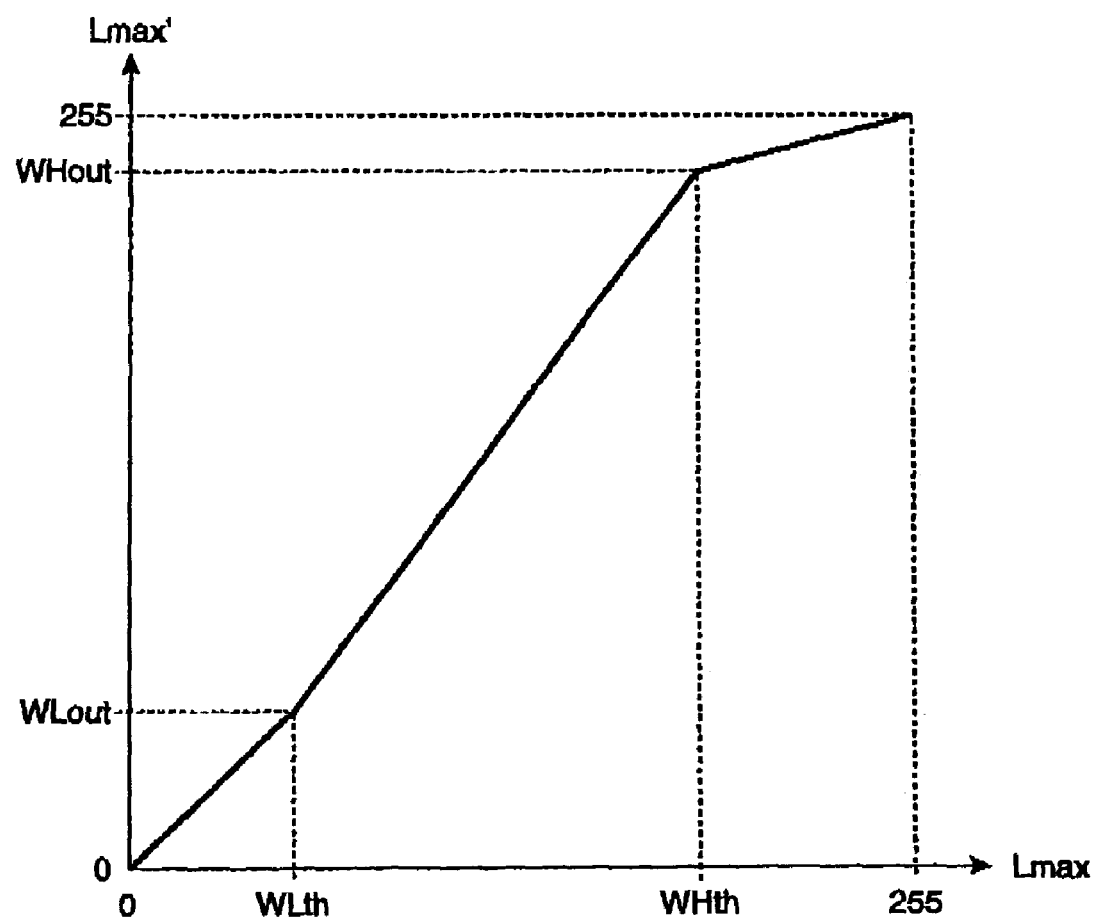
FIG. 11 is a graph illustrating the conversion characteristic of a maximum luminance conversing unit shown in FIG. 5.

FIG. 11 is a graph illustrating the conversion characteristic of the maximum luminance converging unit 46 shown in FIG. 5, where the horizontal axis is the input maximum luminance Lmax and the vertical axis is the output maximum luminance Lmax'. In the graph, a broken line is set such that the output increases as the input increases both from 0 to 255. Meanwhile, this broken line has breaking points so as to provide changes in gradient (rates of change) at predetermined luminances. In this case, the broken line is set so as to provide two breaking points (WLth, WLout) and (WHth, WHout).

This broken line has a greater gradient between (0, 0) and (WLth, WLout) than that between (WHth, WHout) and (255, 255).

Figure 12:
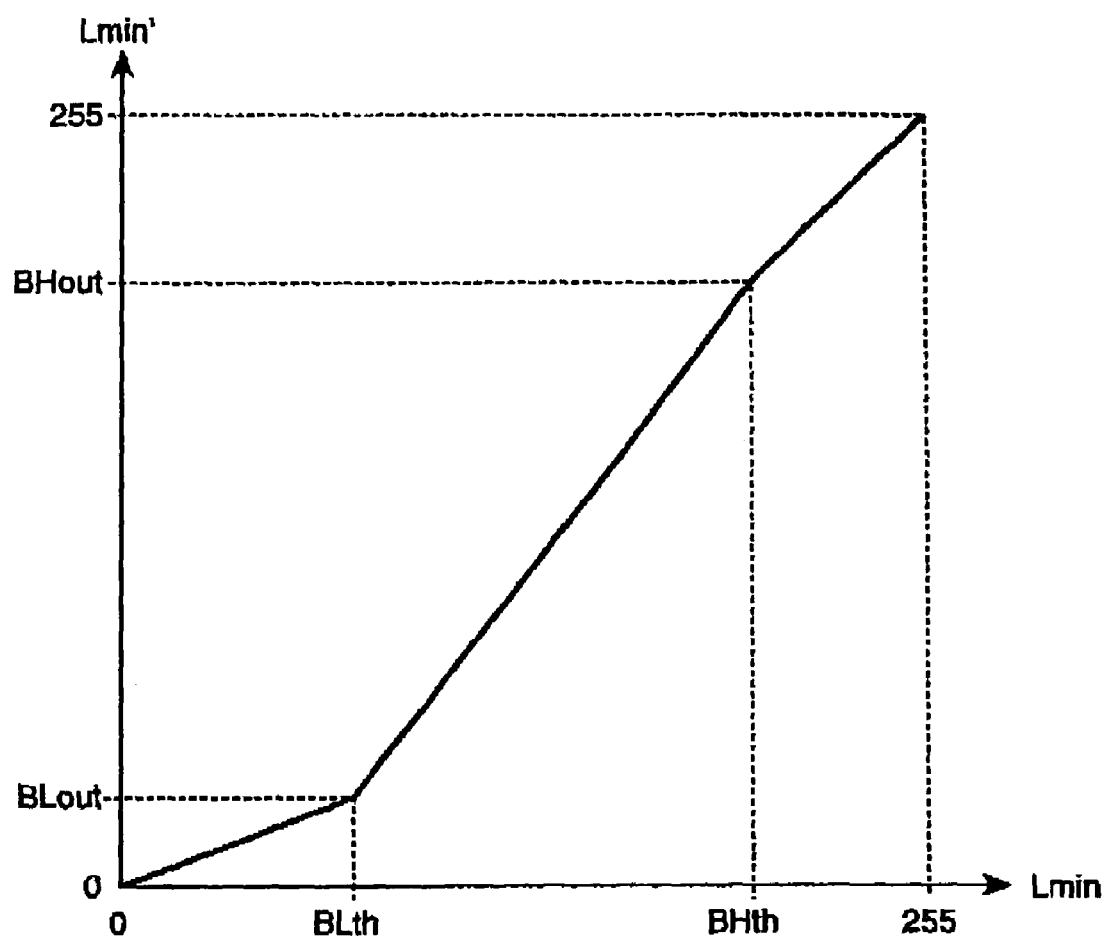
FIG. 12 is a graph illustrating the conversion characteristic of a minimum luminance conversing unit shown in FIG. 5.

FIG. 12 is a graph illustrating the conversion characteristic of the minimum luminance converging unit 48 shown in FIG. 5, where the horizontal axis is the input minimum luminance Lmin and the vertical axis is the output minimum luminance Lmin'. In the graph, a broken line is set such that the output increases as the input increases both from 0 to 255, in a similar fashion to the broken line representing the conversion characteristic of the maximum luminance. This broken line provides two breaking points (BLth, BLout) and (BHth, BHout). This broken line has a smaller gradient between (0, 0) and (BLth, BLout) than that between (BHth, BHout) and (255, 255).

By expanding the luminance towards the white side or black side as described above, the contrast of the image and its image quality can be enhanced.

In this exemplary embodiment, the expansion middle-luminance Lmid serving as a reference threshold for determining the expanding direction, that is, towards the white side or the black side, is given by (Lmax'+Lmin')/4. When a pixel has a greater or smaller luminance than Lmid, the luminance is expanded towards the white or black side respectively.

Expansion magnifications Kw and Kb towards the white and black sides are given by (Lmax'−Lmid)/(Lmax−Lmid) and (Lmid−Lmin')/(Lmid−Lmin), respectively.

The accumulator 510 shown in FIG. 7 computes a value by subtracting the expansion middle-luminance Lmid from the pre-expansion maximum luminance Lmax and outputs this value (=Lmax−Lmid) to the white-direction expansion-magnification operating unit 530.

Also, the accumulator 512 computes a value by subtracting the expansion middle-luminance Lmid from the post-expansion maximum luminance Lmax' and outputs this value (=Lmax'−Lmid) to the white-direction expansion-magnification operating unit 530.

Also, the accumulator 514 computes a value by subtracting the pre-expansion minimum luminance Lmin from the expansion middle-luminance Lmid and outputs this value (=Lmid−Lmin) to the black-direction expansion-magnification operating unit 532.

In addition, the accumulator 516 computes a value by subtracting the post-expansion minimum luminance Lmin' from the expansion middle-luminance Lmid and outputs this value (=Lmid−Lmin') to the black-direction expansion-magnification operating unit 532.

The white-direction expansion-magnification operating unit 530 computes the white-direction expansion magnification: Kw=(Lmax'−Lmid)/(Lmax−Lmid). Also, the black-direction expansion-magnification operating unit 532 computes the black-direction expansion magnification: Kb=(Lmid−Lmin')/(Lmid−Lmin).

The latch unit 560 temporally holds the data representing the white-direction expansion magnification Kw and also outputs this data to the expansion units 30-1 to 30-3. Likewise, the latch unit 562 temporally holds the data representing the black-direction expansion magnification Kb and also outputs this data to the expansion units 30-1 to 30-3.

Also, each of the latch units 560, 562, and 564 updates the data held therein only upon receiving a change request in accordance with the magnification-change request signal from the control unit 20.

The latch units 560, 562, and 564 output data about the white-direction expansion magnification, the black-direction expansion magnification, and the expansion middle-luminance to the expansion units 30-1, 30-2, and 30-3, respectively.

Next, the luminance converging unit 32 is described.

Figure 9:
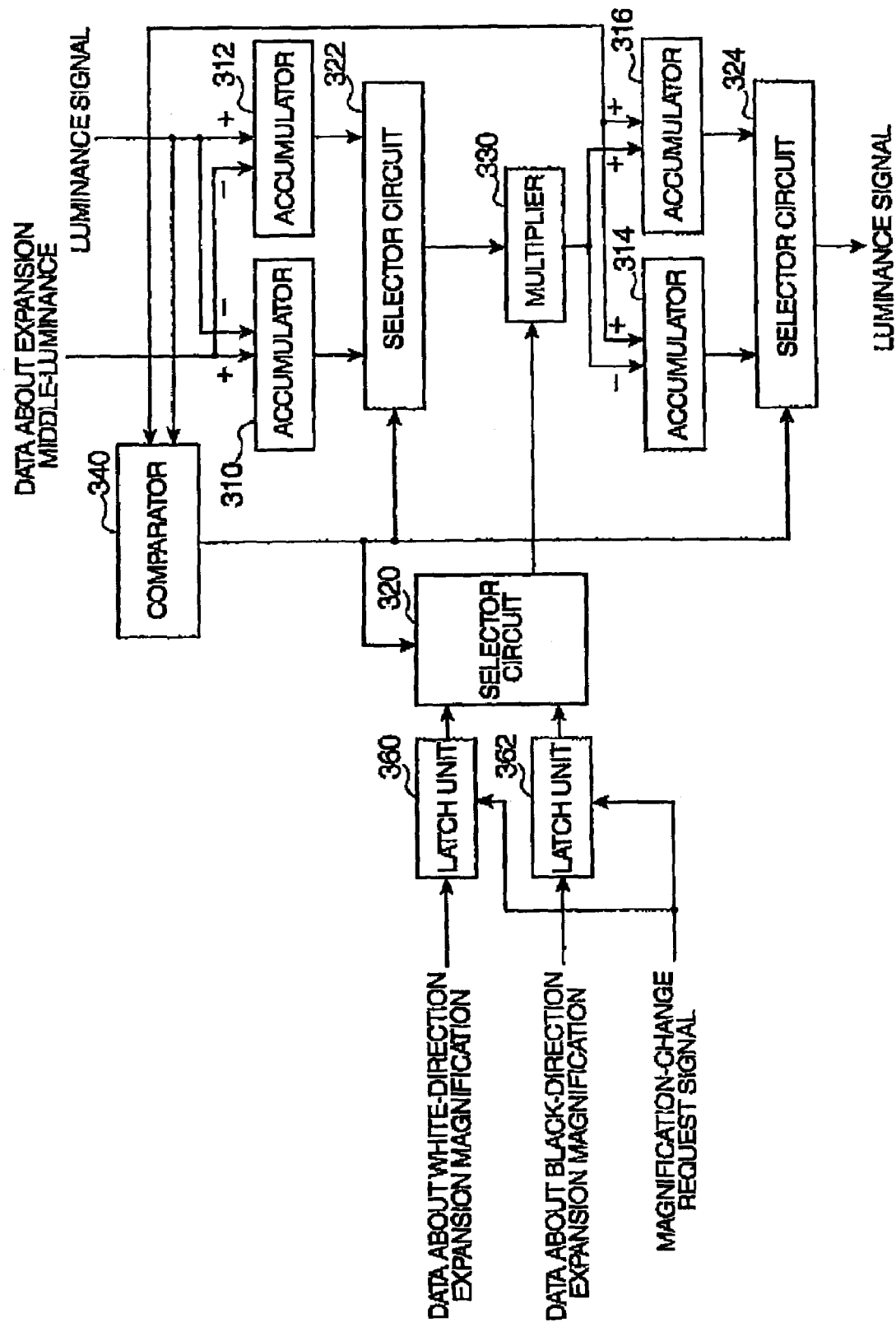
FIG. 9 is a schematic that illustrates the circuit configuration of an expansion unit according to the first exemplary embodiment.

FIG. 9 is an example of the luminance converging unit 32 shown in FIG. 5 according to this exemplary embodiment.

The luminance converging unit 32 includes a latch unit 360 to hold a white-direction expansion-magnification, a latch unit 362 to hold a black-direction expansion-magnification, a selector circuit 320, a comparator 340, accumulators 310, 312, 314, and 316, selector circuits 322 and 324, and a multiplier 330.

The comparator 340 compares the data Lmid about the expansion middle-luminance and a luminance signal L. When Lmid is equal to or greater than L, the comparator 340 outputs a signal "HIGH"; otherwise it outputs a signal "LOW".

When the magnification-change request signal is HIGH, the latch unit 360 receives updated data about the white-direction expansion magnification; otherwise it holds the existing data about the white-direction expansion magnification.

Likewise, when the magnification-change request signal is HIGH, the latch unit 362 receives updated data about the black-direction expansion magnification; otherwise it holds the existing data about the black-direction expansion magnification.

When the signal from the comparator 340 is HIGH, the selector circuit 320 receives the data about the white-direction expansion magnification held in the latch unit 360, and when it is LOW, the selector circuit 320 receives the data about the black-direction expansion magnification held in the latch unit 362.

The accumulator 310 computes a value (=Lmid−L), and the accumulator 312 computes a value (=L−Lmid).

When the output of the comparator 340 is HIGH, the selector circuit 322 outputs the value (=L−Lmid) from the accumulator 312; otherwise it outputs the value (=Lmid−L) from the accumulator 310.

The multiplier 330 multiplies the output of the selector circuit 320 by that of the selector circuit 322.

The accumulator 314 outputs a value obtained by subtracting an output of the multiplier 330 from Lmid. Also, the accumulator 316 outputs a value obtained by adding Lmid to the output of the multiplier 330.

When the output of the comparator 340 is HIGH, the selector circuit 324 outputs the value (=Lmid+output of multiplier 330) of the accumulator 316; otherwise it outputs the value (=Lmid−output of multiplier 330) of the accumulator 314.

As described above, the luminance conversing unit 32 outputs a value (=Kw×(L−Lmid)+Lmid), when L≧Lmid, and outputs another value (=Lmid−Kb×(Lmid−L)), when L<Lmid. For the sake of simple explanation, hereinafter each of these values output by the luminance conversing unit 32 will be denoted as LOUT.

Thus, the luminance conversing unit 32 outputs LOUT to the expansion units 30-1 to 30-3 shown in FIG. 5.

Since the expansion units 30-1 to 30-3 shown in FIG. 5 have the same configurations and functions with each other, only the expansion unit 30-1 processing the R-signal is described. The expansion unit 30-1 outputs a signal ROUT in accordance with the input R-signal, the luminance signal L (the output of the luminance operating unit 10), and the post-expansion luminance LOUT.

More particularly, the expansion unit 30-1 includes a divider and a multiplier. The divider computes the ratio of the luminance LOUT to the luminance signal L, i.e., LOUT/L. Meanwhile, the multiplier computes the product of the foregoing ratio and the R-signal, i.e., (LOUT/L)×R. This value (LOUT/L)×R is the signal ROUT.

Likewise, the expansion units 30-2 and 30-3 output corresponding signals GOUT and BOUT. The luminance from the signal ROUT, the signal GOUT, and the signal BOUT is the luminance LOUT computed by the luminance conversing unit 32, as given by the following expression:

(ROUT+GOUT+BOUT)/3=(LOUT/L)×(R+G+B)signals/3=LOUT.

As described above, according to this exemplary embodiment, since the expansion direction is determined with reference to the threshold in accordance with the maximum and minimum luminances, the reference to determine in which direction; the black or white direction, an expansion is performed is made clear.

Accordingly, when the black-and-white expansion is performed with this reference, an appropriate black-and-white expansion is carried out, thereby enhancing an image quality.

Also, when the scene-change determining unit 103 determines that a scene-change has occurred, the magnification of black-and-white expansion processing varies, thereby reducing or preventing an image from flickering and enhancing the image quality.

Also, in this exemplary embodiment, a luminance is expanded such that, when it is close to the maximum or minimum luminance, its expansion magnification is set smaller than that of a luminance close to the middle luminance.

With this arrangement, by less expanding a luminance lying in a region in which the expansion is less effect and being close to the maximum or minimum luminance and by more expanding the middle-tone luminance, a black-and-white expansion can be effectively performed.

The reason for the above processing is that expansion of the maximum lamination in a region close to black or the minimum luminance in a region close to white makes the color of an image unsharp.

Furthermore, in this exemplary embodiment, although the luminance operating unit 10 provides a luminance by evenly dividing each of the R-signal, G-signal, and B-signal, the typical value (=0.30×R-signal+0.59×G-signal+0.11×B-signal) may be used as the luminance.

Also, by evenly multiplying the expansion magnification computed as described above by each of the luminances from the R-signal, G-signal, and B-signal, the color balance of the image is maintained, thereby improving the image quality.

Second Exemplary Embodiment

Figure 10:
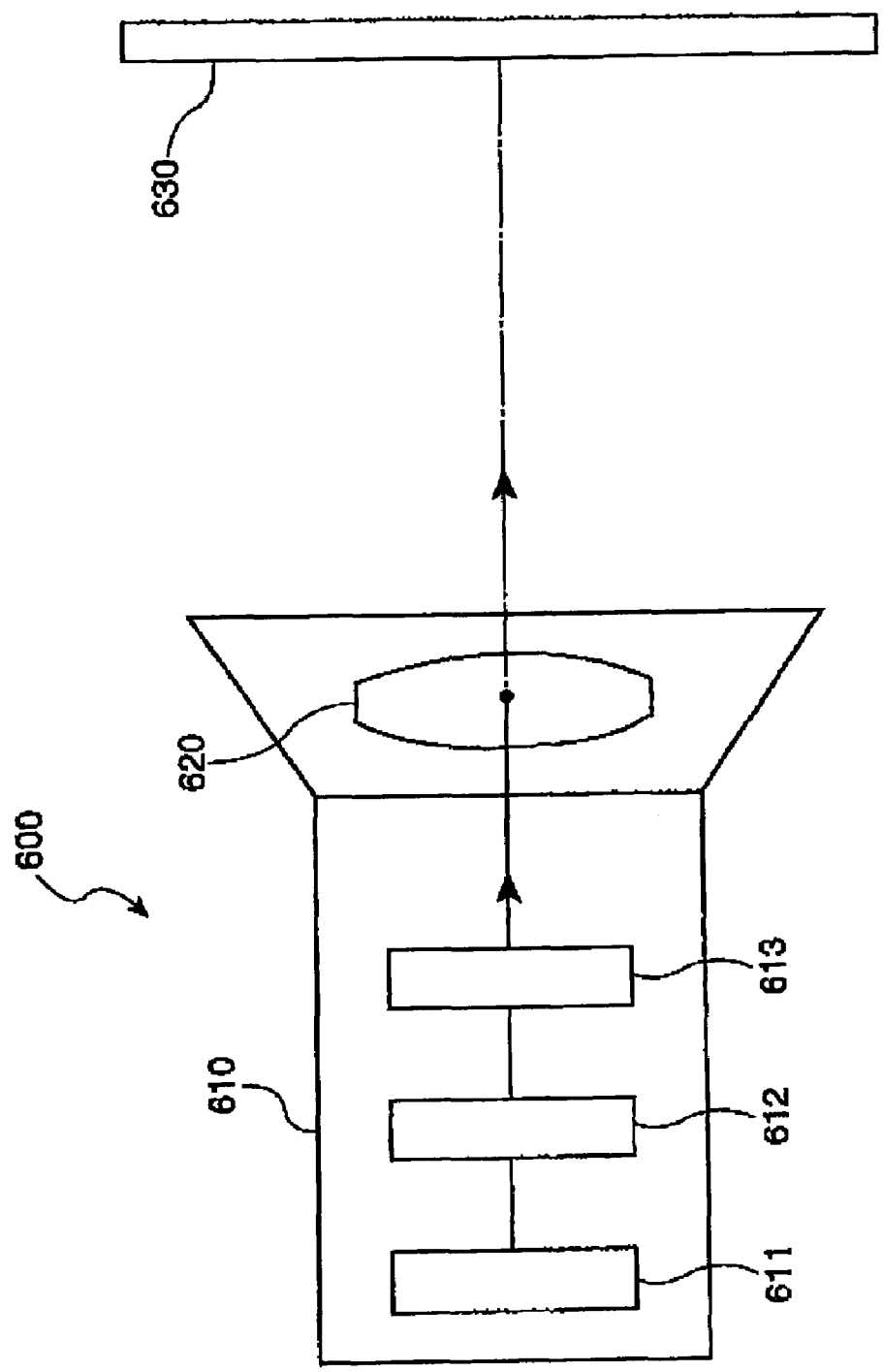
FIG. 10 is a schematic that illustrates the structure of a projector according to a second exemplary embodiment of the present invention.

FIG. 10 is a schematic that illustrates the structure of a projector 600 according to a second exemplary embodiment of the present invention, which includes a main body 510 and a projection lens system 620. The main body 510 includes a light source 611 to feed illumination light, a space modulation element 612 to modulate the light from the light source in accordance with the image signal, and an image processing apparatus 613 set forth in the first exemplary embodiment. The projection lens system 620 projects an image of its display unit onto a screen 630 in an enlarged manner.

A preferred example of an application of this embodiment of the present invention includes a digital video apparatus. The foregoing image processing method according to the present invention can be applied to pre-processing of tone-conversion processing in the digital video apparatus. In addition, the present invention is also applicable to a video editing apparatus and the like. In this case, since an optimal scene-change detection for a currently dealing scene can be applied as a function for finding the beginning of every scene and the like. For example, the video editing apparatus can be constructed so as to start the recording of video signals into a recording medium when an output (a magnification-change request signal shown in FIG. 5) from the scene-change determining unit 103 shown in FIG. 3 is HIGH. The present invention is not limited to the foregoing exemplary embodiments, and a variety of modifications are possible without departing from the spirit of the invention.

EXEMPLARY ADVANTAGES

As described above, there are provided an image processing method, an image processing apparatus, and a projector, which determines a scene-change to an enhanced or optimal tone-conversion, luminance correction, or the like for each scene of a moving image.

What is claimed is:

1. An image processing method, comprising:
computing a normalized luminance histogram of each frame;
computing scene-change-detecting reference values corresponding to correlations between two normalized luminance histograms of first and second frames computed in the computing of a normalized luminance histogram of each frame; and
determining whether a change in scenes between images of the first and second frames has occurred or not, in accordance with the scene-change-detecting reference values.

2. The image processing method according to claim 1, the scene-change-detecting reference values including at least first and second scene-change-detecting reference values.

3. The image processing method according to claim 2, in order to compute the first scene-change-detecting reference value, the computing of scene-change-detecting reference values including:
computing the product of two distribution frequencies at each corresponding luminance level of the two normalized luminance histograms of the first and second frames;

computing the square value of the distribution frequency at the corresponding luminance level of the normalized luminance histogram of the first frame;

computing an absolute difference in the product and the square value; and computing the sum total of the absolute differences in a range of the luminance levels from the minimum luminance to the maximum luminance.

4. The image processing method according to claim 2, in order to compute the second scene-change-detecting reference value, the computing of scene-change-detecting reference values including:

computing the product of two distribution frequencies at each corresponding luminance level of the two normalized luminance histograms of the first and second frames;

computing the square value of the distribution frequency at the corresponding luminance level of the normalized luminance histogram of the second frame;

computing an absolute difference in the product and the square value; and computing the sum total of the absolute differences in a range of the luminance levels from the minimum luminance to the maximum luminance.

5. The image processing method according to claim 2, the scene-change determining including: comparing at least one of the first and second scene-change-detecting reference values with a predetermined threshold; and determining that a change in the scenes has occurred when said at least one of the scene-change-detecting reference values is equal to or greater than the predetermined threshold.

6. The image processing method according to claim 5, the comparing and determining including determining that a change in the scenes has occurred when both the first and second scene-change-detecting reference values are equal to or greater than another threshold which is smaller than the predetermined threshold.

7. The image processing method according to claim 5, the comparing and determining including determining that a change in the scenes has occurred when the sum of the first and second scene-change-detecting reference values is equal to or greater than a predetermined value.

8. An image processing apparatus, comprising:

a normalized-luminance-histogram computing unit to compute a normalized luminance histogram of each frame;

a normalized-luminance-histogram storage unit to store the normalized luminance histogram of the frame;

a scene-change-detecting reference-value computing unit to compute scene-change-detecting reference values corresponding to correlations between two normalized luminance histograms of first and second frames stored in the normalized-luminance-histogram storage units; and a scene-change determining unit to determine that a change in scenes between images of the first and second frames has occurred or not, in accordance with the scene-change-detecting reference values.

9. A projector, comprising:

a light source to feed illumination light;

a space modulation element to modulate the light from the light source in accordance with an image signal;

the image processing apparatus according to claim 8 to process an image from the space modulation element; and a projection lens system to project the image processed by the image processing apparatus.

* * * * *